(12) United States Patent
Huang (10) Patent No.: US 7,251,107 B2
(45) Date of Patent: Jul. 31, 2007

(54) METHOD AND APPARATUS FOR PROVIDING AN AIR BEARING PAD HAVING IMPROVED ROLL ANGLE SIGMA

(75) Inventor: Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 336 days.

(21) Appl. No.: 10/903,980

(22) Filed: Jul. 30, 2004

(65) Prior Publication Data
US 2006/0023360 A1    Feb. 2, 2006

(51) Int. Cl.
    G11B 21/20    (2006.01)
(52) U.S. Cl. ................................... 360/235.8
(58) Field of Classification Search ............ 360/235.4, 360/235.5, 235.6, 235.7, 235.8, 235.9, 236, 360/236.1, 236.3, 236.4, 236.6, 236.7, 236.8, 360/237
See application file for complete search history.

(56) References Cited

U.S. PATENT DOCUMENTS

| | | | |
|---|---|---|---|
| 5,309,303 A | 5/1994 | Hsia et al. | |
| 5,430,591 A | 7/1995 | Takeuchi et al. | |
| 5,550,692 A | 8/1996 | Crane | |
| 5,721,650 A | 2/1998 | Crane et al. | |
| 5,739,981 A | 4/1998 | Cha et al. | |
| RE35,800 E | 5/1998 | Chapin | |
| 5,910,865 A | 6/1999 | Wang et al. | |
| 6,023,394 A * | 2/2000 | Ito et al. ................... | 360/235.7 |
| 6,034,842 A * | 3/2000 | Cha ........................ | 360/235.6 |
| 8,055,129 | 4/2000 | Park et al. | |
| 6,212,032 B1 | 4/2001 | Park et al. | |
| 6,525,909 B1 | 2/2003 | Qian et al. | |
| 6,583,961 B2 | 6/2003 | Levi et al. | |
| 6,606,222 B1 * | 8/2003 | Ryun ........................ | 360/236.5 |
| 6,646,832 B2 * | 11/2003 | Anaya-Dufresne et al. ...... | 360/236.2 |
| 6,765,758 B1 * | 7/2004 | Cha ........................ | 360/236.1 |
| 2002/0089789 A1 | 7/2002 | Baba et al. | |

FOREIGN PATENT DOCUMENTS

| | | |
|---|---|---|
| JP | 3035136 | 12/1996 |
| JP | 10027326 | 1/1998 |

* cited by examiner

Primary Examiner—Angel Castro
(74) Attorney, Agent, or Firm—David W. Lynch; Chambliss, Bahner & Stophel PC (57) ABSTRACT

A method and apparatus for providing an air bearing pad having improved roll angle sigma is disclosed. Two Z-shaped air bearing pads are formed to provide two additional negative pockets for improving roll angle stiffness of the slider and for shrinking the air bearing area.

17 Claims, 5 Drawing Sheets

METHOD AND APPARATUS FOR PROVIDING AN AIR BEARING PAD HAVING IMPROVED ROLL ANGLE SIGMA

BACKGROUND OF THE INVENTION

1. Field of the Invention

This disclosure relates in general to air bearing pads for magnetic storage devices, and more particularly to a method and apparatus for providing an air bearing pad having improved roll angle sigma.

2. Description of Related Art

Fixed magnetic storage systems are now commonplace as a main non-volatile storage in modern personal computers, workstations, and portable computers. Storage systems are now capable of storing gigabyte quantities of digital data, even when implemented in portable computers.

Magnetic recording systems that utilize magnetic disk and tape drives constitute the main form of data storage and retrieval in present-day computer and data processing systems. Many important advances have been made that provide higher data density and thus increased storage capacities for storage systems. These advances include faster access speeds and faster access times resulting in a greater bandwidth of data communicated to and from the storage systems. Advances have also been made by greatly reducing the size and weight of the storage systems, resulting in the availability of ultra-light portable computers having state-of-the art capabilities and performance.

A disk drive is one example of a magnetic storage system. A disk drive storage system, for example, uses a rotatable disk with concentric data tracks containing information, a head for reading and/or writing data onto the various tracks, and an actuator connected to a sensor for moving the sensor to a desired track and maintaining the sensor over the track centerline during read and write operations. The sensor is suspended in close proximity to a recording medium. For example, the sensor may be suspended over a magnetic disk having a plurality of concentric tracks. Another type of magnetic storage system includes a magnetic tape system. However, storage systems are not limited merely to the above-mentioned magnetic storage systems.

Disk drive storage systems utilize thin film head designs that are mostly variations of a merged design or a piggyback design. The merged design, as well as the piggyback design, places a write element atop a read sensor. In these dual-element designs, an inductive coil element used for writing and a magnetoresistive (MR) element used for reading are spaced apart from one another in a direction perpendicular to the trailing end of the merged head.

In the recording process, information is written and stored as magnetization patterns on the magnetic recording medium. Scanning a write head over the medium and energizing the write head with appropriate current waveforms accomplish this recording process. In a read-back process, scanning a magnetoresistive (MR) sensor over the medium retrieves the stored information. This MR read head sensor intercepts magnetic flux from the magnetization patterns on the recording medium and converts the magnetic flux into electrical signals, which are then detected and decoded.

There are typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a relatively fragile suspension that connects the slider to the actuator. The spacing between the slider and the disk surface is called the flying height and its precise value is critical to the proper function of the reading and writing process.

The inductive write head and MR read head may be patterned, for example, on the trailing end of the slider, which is the portion of the slider that flies closest to the disk surface. An important factor affecting a real density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics. To achieve such results, the slider may be biased toward the disk surface by a small spring force from the suspension, or "self-loaded" to the disk surface by means of a "negative-pressure" air-bearing surface on the slider.

Another important factor affecting fly height is the slider's resistance to changing conditions. An air bearing slider is subjected to a variety of changing external conditions during normal operation. Changing conditions affecting fly height include, for example, change in the relative air speed and direction, and variations in temperature. If the transducer fly height does not stay constant during changing conditions, data transfer between the transducer and the recording medium may be adversely affected. Fly height is further affected by physical characteristics of the slider such as the shape of the ABS. Careful rail shaping, for example, will provide some resistance to changes in air flow.

Performance requirements today require sliders having trailing air bearing pads with smaller and smaller widths to provide better protrusion compensation effect and minimum fly height variation. Some of current designs have the trailing edge air bearing width as narrow as 70 µm. However, this often creates undesirable roll motion stiffness in the air bearing, This worsens the minimum fly height sigma and worsens other dynamic motions in the head/disk interface, such as damping.

One solution is to add side air bearing pads on the side rails. But the risk is that minimum flying height point can be on those pads and leads to severe mechanical integration problems. Another problem is the air bearing surface area is preferred to be as small as possible to have low crown sensitivity and low friction force when the sliders is in contact with the disk surface.

It can be seen that there is a need for a method and apparatus for providing an air bearing pad having improved roll angle sigma.

SUMMARY OF THE INVENTION

To overcome the limitations described above, and to overcome other limitations that will become apparent upon reading and understanding the present specification, the present invention discloses a method and apparatus for providing an air bearing pad having improved roll angle sigma The present invention solves the above-described problems by forming Z-shaped air bearing pads, two additional negative pockets are provided for improving roll angle stiffness of the slider and for shrinking the air bearing area.

A slider in accordance with the principles of an embodiment of the present invention includes a crossrail disposed proximate a leading edge of a slider, two side rails disposed on opposite sides of the slider and two generally Z-shaped air bearing pads formed between the crossrail and the two side rails.

In another embodiment of the present invention, a magnetic storage system is provided. The magnetic storage system includes at least one magnetic storage medium, a motor for moving the at least one magnetic storage medium, a slider having a magnetic head mounted thereon for reading and writing data on the at least one magnetic storage medium and an actuator, coupled to the slider, for positioning the slider relative to the at least one magnetic storage medium, wherein the slider further comprises a crossrail disposed proximate a leading edge of a slider, two side rails disposed on opposite sides of the slider and two generally Z-shaped air bearing pads formed between the crossrail and the two side rails.

In another embodiment of the present invention, a method for providing an air bearing pad with improved roll angle sigma is provided. The method includes forming a slider surface, forming Z-shaped air bearing pads on opposite sides of the slider surface and forming a central leading negative pressure pocket and two side negative pressure pockets.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing an air bearing pad having improved roll angle sigma. The present invention provides Z-shaped air bearing pads to provide two additional negative pockets for improving roll angle stiffness of the slider and for shrinking the air bearing area.

Figure 1:
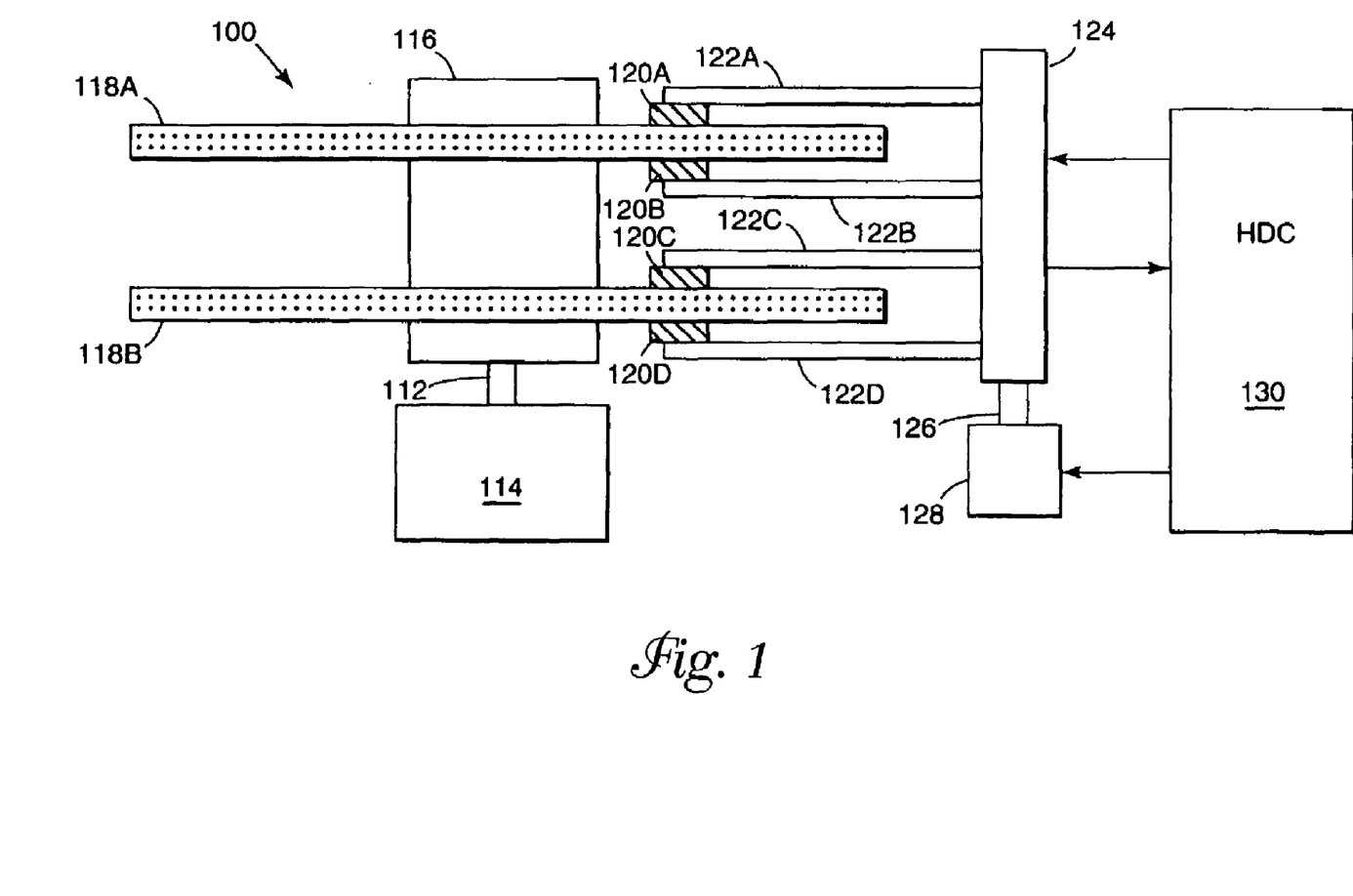
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
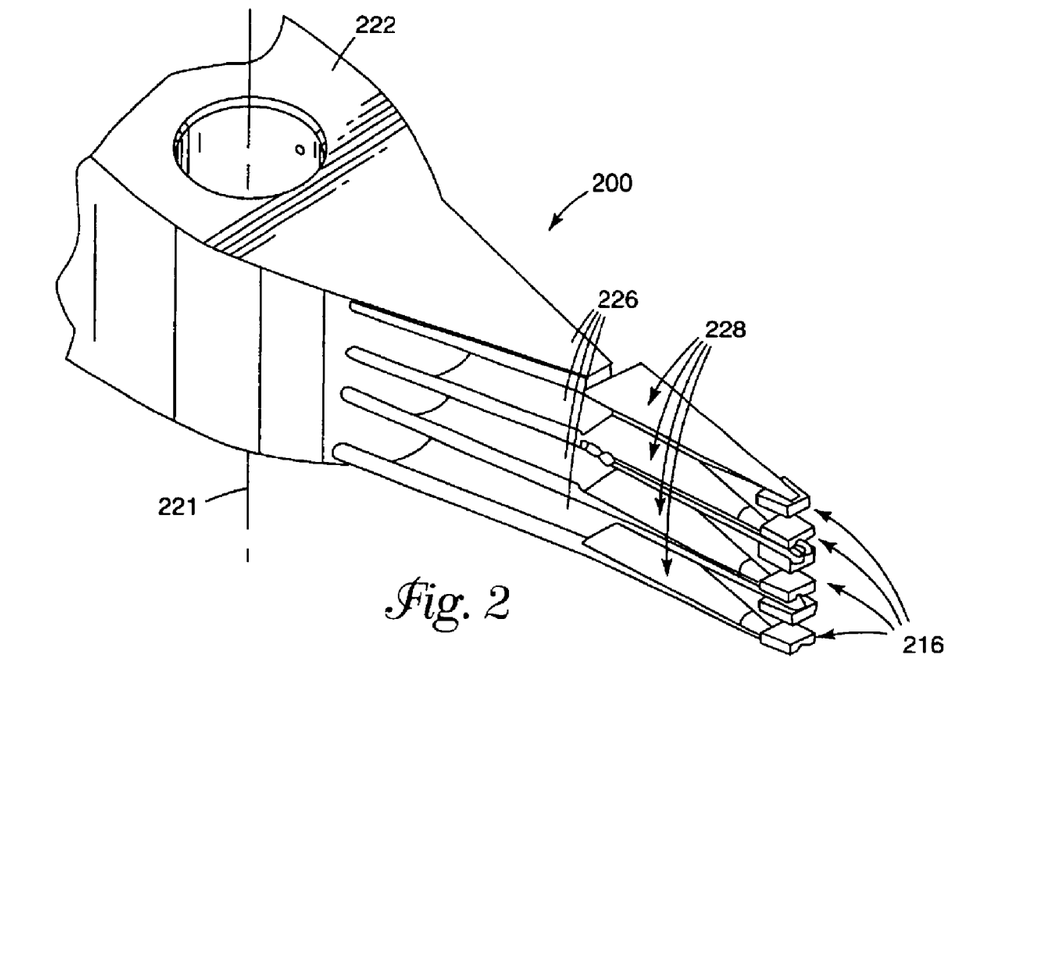
FIG. 2 is a perspective view of an actuator assembly.

FIG. 2 is a perspective view of an actuator assembly 200. Actuator assembly 200 includes base portion 222, a plurality of actuator arms 226, a plurality of load beams 228, and a plurality of head gimbal assemblies 216. Base portion 222 includes a bore that is, in the preferred embodiment, coupled for pivotal movement about axis 221. Actuator arms 226 extend from base portion 222 and are each coupled to the first end of either one or two load beams 228. Load beams 228 each have a second end, which is coupled to a head gimbal assembly 216. According to the present invention, multiple, independently controlled actuator assemblies 200 are provided in a disk drive.

Figure 3:
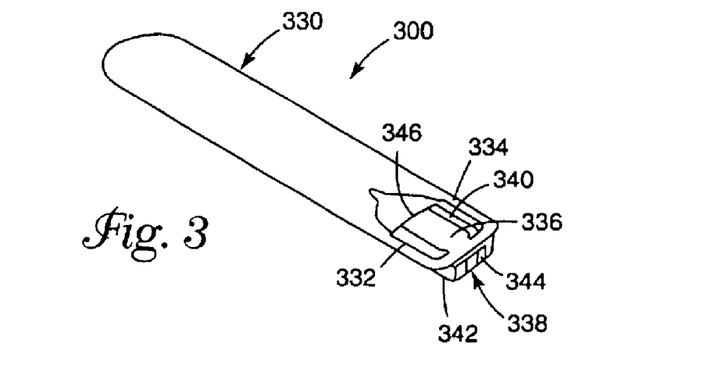
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338, which has an upper surface 340, and a lower, air bearing surface 342. Transducers 344 are also preferably located on a trailing edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

A conventional slider design starts off with a flat polished surface, from which a patterned ABS is created by a removal process such as etching or ion milling. The ABS is always the top most polished surface and pressurizes with positive pressure to lift the ABS up producing an air cushion above the disk. Air bearing surfaces are formed by single or dual etch processing which result in either 2 or 3 surface levels, respectively.

Figure 4:
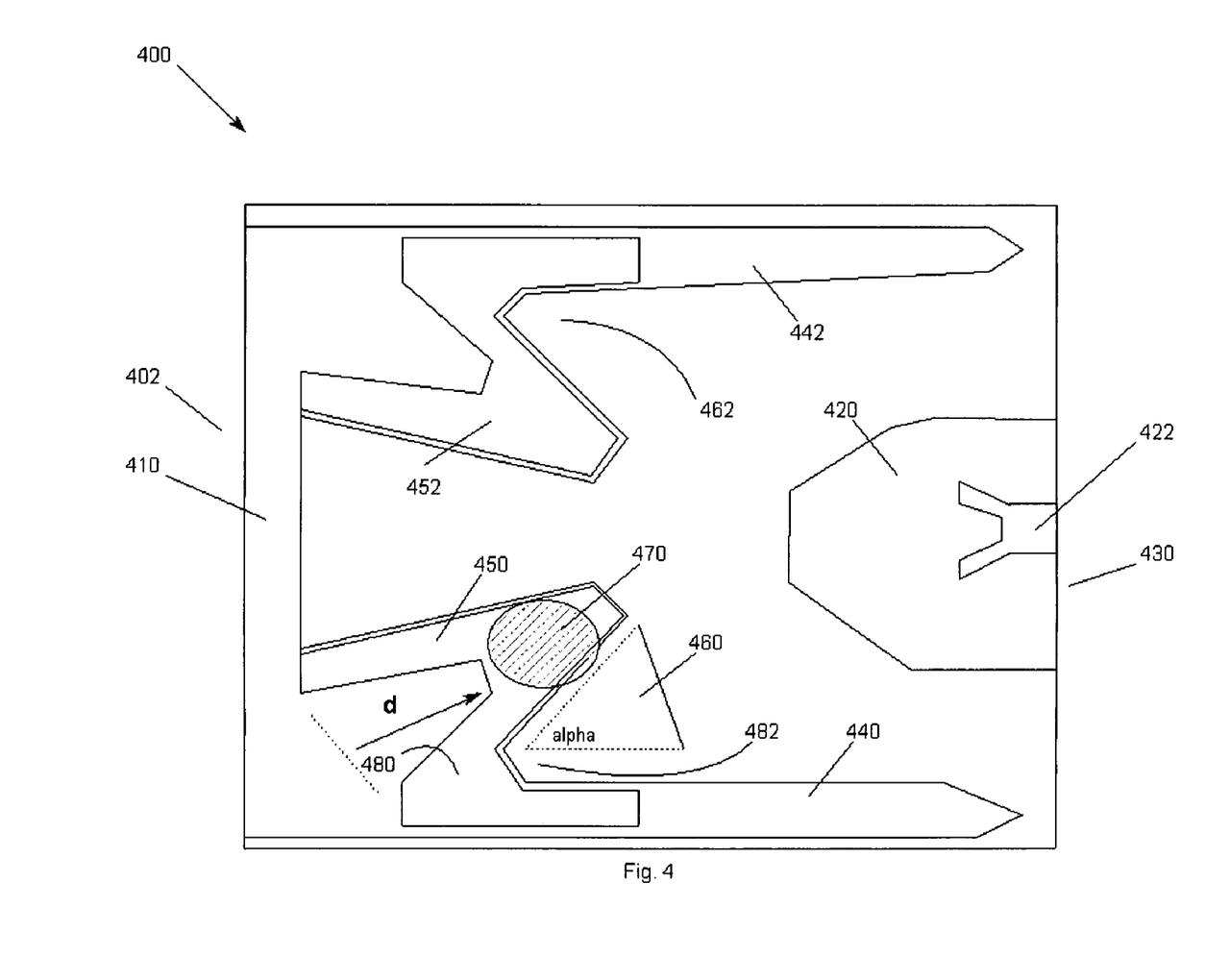
FIG. 4 illustrates a slider design for providing an air bearing pad having improved roll angle sigma according to an embodiment of the present invention.

FIG. 4 illustrates a slider design 400 for providing an air bearing pad having improved roll angle sigma according to an embodiment of the present invention. In FIG. 4, a crossrail 410 is provided at the leading ledge 402. A rear shelf 420 having a rear pad 422 is provided at center of the trailing end 430. Side rails 440, 442 are provided along each side of the slider 400. In conventional slider designs, quadralaterals leading edge air bearing pads are provided between the two side rails 440, 442 and the crossrail 410. However, according to an embodiment of the present invention, disposed between the side rails 440, 442 and the crossrail 410 are "Z" shape air bearing pads 450, 452. The Z-shape air bearing pads 450, 452 create two additional negative pockets 460, 462. The two additional negative pockets 460, 462 improve the roll angle stiffness and shrink the air bearing area. The two additional negative pockets 460, 462 also minimize the area bearing area needed.

The two Z-shape air bearing pads 450, 452 are substantially mirror images of each other. In FIG. 4, the recession, d, creates a high pressure area near the pad surface 470. This applies for the opposite side of the slider 400 as well. The recession, d, helps the pressurization at the leading edge 410. Therefore, the recession, d, makes the needed air bearing surface much smaller thereby minimizing the potential contact area.

The total depths from the air bearing surface 480 to the RIE (Reactive Ion Etch) surface 482 create strong negative pressure area areas while the angle, alpha, prevents air flow coming from other directions from entering into these negative areas 460, 462. Regular ion milling processes can easily form the Z-shaped air bearing surface 450, 452.

Figure 5:
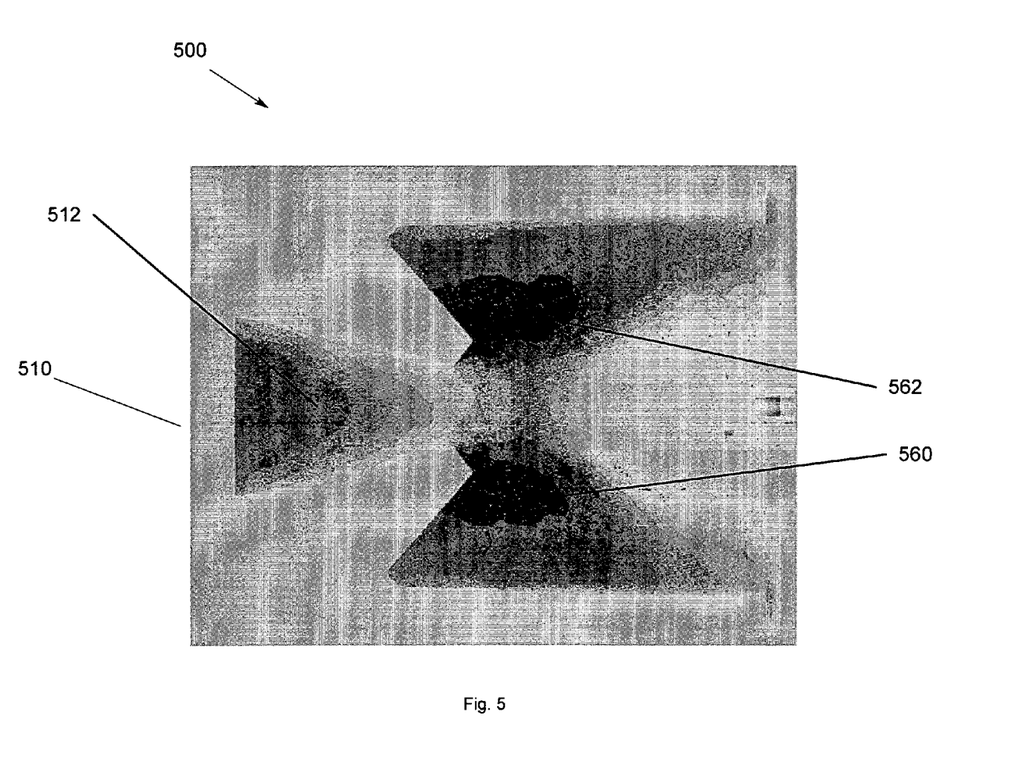
FIG. 5 is a diagram showing the pressure distribution for the slider of FIG. 5.

FIG. 5 is a diagram 500 showing the pressure distribution for the slider of FIG. 5. As can be seen in FIG. 5, a conventional center negative pressure pocket 512 is provided in the center near the leading edge 510. According to the present invention, two negative pressure zones 560, 562 are provided at each side of the slider. The two negative pressure zones 560, 562 are extremely helpful for increasing roll angle stiffness, therefore improving minimum flying height sigma.

Figure 6:
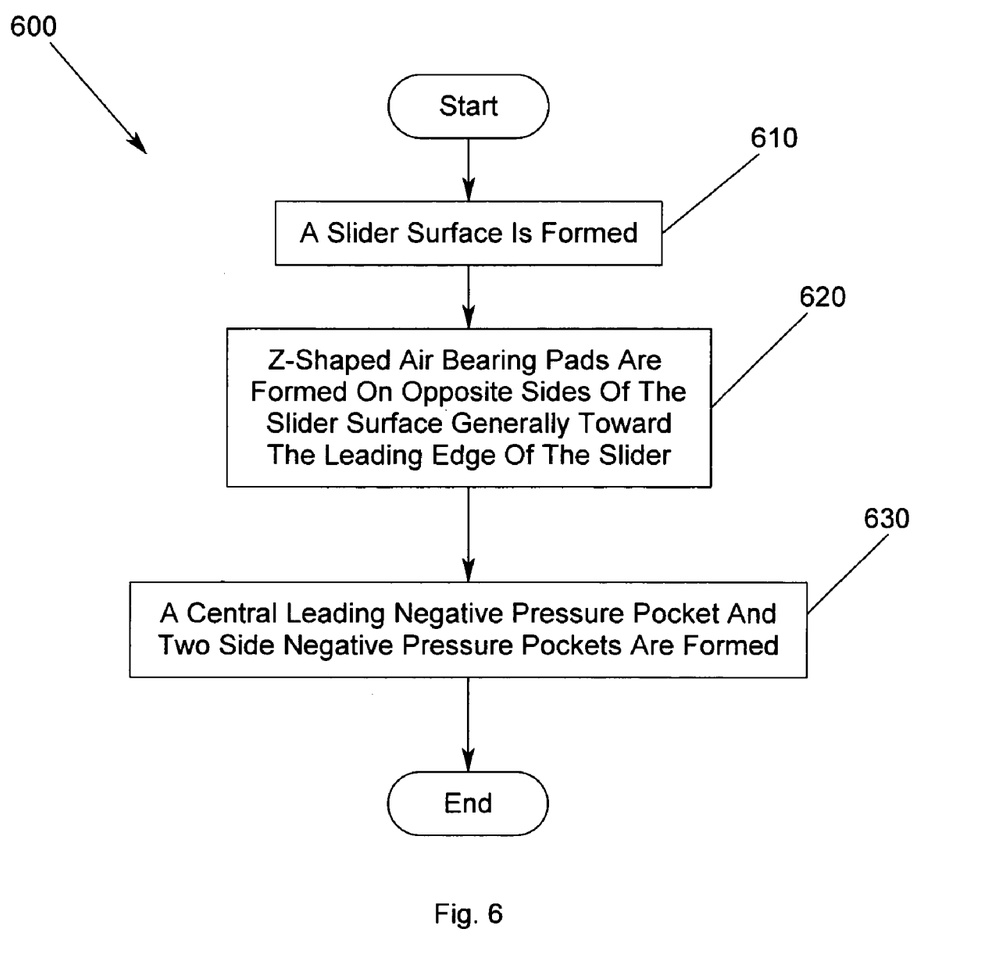
FIG. 6 is a flow chart of a method for providing an air bearing pad having improved roll angle sigma according to an embodiment of the present invention.

FIG. 6 is a flow chart 600 of a method for providing an air bearing pad having improved roll angle sigma according to an embodiment of the present invention. A slider surface is formed 610. Z-shaped air bearing pads are formed on opposite sides of the slider surface generally toward the leading edge of the slider 620. A central leading negative pressure pocket and two side negative pressure pockets are formed 630 resulting in a crossrail, side rails and Z-shaped air bearing pad shelves supporting the Z-shaped air bearing pads. Accordingly, the Z-shaped air bearing pads provide two additional negative pockets for improving roll angle stiffness of the slider and for shrinking the air bearing area.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An slider for a magnetic storage device, comprising:
    a crossrail disposed proximate a leading edge of the slider;
    two side rails disposed on opposite sides of the slider; and
    two generally Z-shaped air bearing pads formed between the crossrail and the two side rails, wherein the generally Z-shaped air bearing pads each include a generally forward facing V-shaped recession and a generally rear facing V-shaped recession forming a negative pressure pocket area.

2. The slider of claim 1, wherein the generally rear facing V-shaped recessions each include an inner rail portion for preventing air flow from entering into the negative pressure pocket area.

3. The slider of claim 1, further comprising a first and second rail projection extending toward the trailing edge from a junction of the crossrail and the side rails, the first and second rail projections being angled toward a central longitudinal axis of the slider, the generally Z-shaped air bearing pads being formed thereon.

4. The slider of claim 1 further comprising a rear shelf having a rear pad formed thereon, the rear shelf and read pad formed generally at the center of a trailing end.

5. The slider of claim 1, wherein the two Z-shape air bearing pads are substantially mirror images of each other.

6. The slider of claim 1, wherein the generally forward facing V-shaped recessions of the two generally Z-shaped air being pads create a high pressure area near the surface of the Z-shaped air bearing pads.

7. The slider of claim 6, wherein the high pressure provided by the generally forward facing V-shaped recessions reduce a needed air bearing surface.

8. A magnetic storage system, comprising
    at least one magnetic storage medium;
    a motor for moving the at least one magnetic storage medium;
    a slider having a magnetic head mounted thereon for reading and writing data on the at least one magnetic storage medium; and
    an actuator, coupled to the slider, for positioning the slider relative to the at least one magnetic storage medium;
    wherein the slider further comprises
        a crossrail disposed proximate a leading edge of slider; the
        two side rails disposed on opposite sides of the slider; and
        two generally Z-shaped air bearing pads formed between the crossrail and the two side rails, wherein the generally Z-shaped air bearing pads each include a generally forward facing V-shaped recession and a generally rear facing V-shaped recession forming a negative pressure pocket area.

9. The magnetic storage system of claim 8, wherein the generally rear facing V-shaped recessions each include an inner rail portion for preventing air flow from entering into the negative pressure pocket area.

10. The magnetic storage system of claim 8, further comprising a first and second rail projection extending toward the trailing edge from a junction of the crossrail and the side rails, the first and second rail projections being angled toward a central longitudinal axis of the slider, the generally Z-shaped air bearing pads being formed thereon.

11. The magnetic storage system of claim 8 further comprising a rear shelf having a rear pad formed thereon, the rear shelf and read pad formed generally at the center of a trailing end.

12. The magnetic storage system of claim 9, wherein the two Z-shape air bearing pads are substantially mirror images of each other.

13. The magnetic storage system of claim 8, wherein the generally forward facing V-shaped recessions of the two generally Z-shaped air being pads create a high pressure area near the surface of the Z-shaped air bearing pads.

14. The magnetic storage system of claim 13, wherein the high pressure provided by the generally forward facing V-shaped recessions reduce the needed air bearing surface.

15. A method for providing an air bearing pad with improved roll angle sigma, comprising:
    forming a slider surface;
    forming a crossrail disposed proximate a leading edge of the slider surface;
    forming two side rails disposed on opposite sides of the slider; and
    forming two generally Z-shaped air bearing pads having a generally forward facing V-shaped recession and a generally rear facing V-shaped recession forming a negative pressure pocket area, the two generally Z-shaped air bearing pads formed to extend from between the crossrail and the two side rails.

16. The method of claim 15, wherein the forming Z-shaped air bearing pads having a generally forward facing V-shaped recession and a generally rear facing V-shaped recession forming a negative pressure pocket area comprises forming the generally rear facing V-shaped recessions with an inner rail portion for preventing air flow from entering into the negative pressure pocket area.

17. The method of claim 15, further comprising forming a first and second rail projection for supporting the two generally z-shaped air bearing pads extending toward the trailing edge from a junction of the crossrail and the side rails, the first and second rail projections being angled toward a central longitudinal axis of the slider.

* * * * *

UNITED STATES PATENT AND TRADEMARK OFFICE
CERTIFICATE OF CORRECTION

PATENT NO.        : 7,251,107 B2                              Page 1 of 1
APPLICATION NO. : 10/903980
DATED             : July 31, 2007
INVENTOR(S)       : Huang

It is certified that error appears in the above-identified patent and that said Letters Patent is hereby corrected as shown below:

On the title page (56) In References Cited: "8,055,129" should read -- 6,055,129 --

Col. 6, Line 23: "edge of slider; the" should read --edge of the slider; --
Col. 6, Line 47: "claim 9" should read -- claim 8 --

Signed and Sealed this

Sixteenth Day of October, 2007

JON W. DUDAS
*Director of the United States Patent and Trademark Office*